United States Patent [19]

Ohtake

[11] Patent Number: 5,678,071
[45] Date of Patent: Oct. 14, 1997

[54] VARIABLE FOCAL LENGTH OPTICAL SYSTEM CAPABLE OF SHIFTING IMAGE

[75] Inventor: Motoyuki Ohtake, Kawasaki, Japan

[73] Assignee: Nikon Corporation, Tokyo, Japan

[21] Appl. No.: 699,859

[22] Filed: Aug. 20, 1996

[30] Foreign Application Priority Data

Aug. 23, 1995 [JP] Japan ..................... 7-237781

[51] Int. Cl.$^6$ ..................... G03B 7/08
[52] U.S. Cl. ............. 396/55; 359/557; 348/208
[58] Field of Search ................. 396/52, 53, 54, 396/55; 348/208; 359/554, 557

[56] References Cited

U.S. PATENT DOCUMENTS

| | | | |
|---|---|---|---|
| 5,192,964 | 3/1993 | Shinohara et al. | 396/55 |
| 5,479,236 | 12/1995 | Tanaka | 396/55 |
| 5,579,171 | 11/1996 | Suzuki et al. | 359/557 X |

FOREIGN PATENT DOCUMENTS

| | | |
|---|---|---|
| 16-8558 | 5/1941 | Japan . |
| 63-118708 | 5/1988 | Japan . |

*Primary Examiner*—Howard B. Blankenship
*Attorney, Agent, or Firm*—Shapiro and Shapiro

[57] ABSTRACT

In a variable focal length optical system wherein a shift lens unit constituting a portion of the optical system can be moved in a direction substantially perpendicular to the optical axis of the optical system to thereby shift an image, the shift lens unit is driven on the basis of the focal length information of the optical system to correct any variation in image position due to the vibration of the optical system. When, for example, a focusing lens unit movable along the optical axis during focusing on a short distance object is disposed more adjacent to the object side than the shift lens unit, the required amount of drive of the shift lens unit is calculated on the basis of the focal length information and a memorized predetermined coefficient.

10 Claims, 4 Drawing Sheets

VARIABLE FOCAL LENGTH OPTICAL SYSTEM CAPABLE OF SHIFTING IMAGE

BACKGROUND OF THE INVENTION

1. Field of the Invention

This invention relates to a variable focal length optical system capable of shifting an image, and more particularly to a variable focal length optical system of which a portion can be made eccentric to thereby shift an image and which is small in the deterioration of performance during the shift of the image.

2. Related Background Art

In the camera field the automatization of various operations such as automatic exposure, automatic focusing, automatic winding and rewinding of film has been advanced by the electrical and mechanical advancement of various elemental techniques constituting a camera, and particularly recently, the failure in photographing due to the excess and deficiency of exposure or out-of-focus has been remarkably decreased by the higher accuracy of automatic exposure and automatic focusing. With the advancement of these elemental techniques, the downsizing and lighter weight of camera bodies have been advanced.

Also, as the latest tendency of cameras, it can be mentioned that cameras provided with zoom lenses are becoming the mainstream.

As the cameras provided with zoom lenses become the mainstream, there have been made various propositions regarding zoom lenses in which an increase in zoom ratio and higher performance have been contrived. Particularly, cameras provided with a zoom lens in which an increase in zoom ratio has been contrived by the use of a so-called multiunit zoom lens comprised of three or more movable lens units are increasing. In these high zoom ratio zoom lenses, particularly the focal length of the telephoto end extends to the longer focus side and impressive photographs more approximate to objects can be taken.

However, the downsizing and lighter weight of camera bodies or the longer focus of the focal length of a lens system is liable to cause the failure in photographing by hand vibration. So, various propositions have heretofore been made regarding a so-called vibration reduction optical system for correcting the fluctuation of image position attributable to the vibration of the optical system caused by hand vibration. Various propositions have been made particularly regarding a zoom lens in which some lens units of the lens system are moved (shifted) in a direction substantially perpendicular to the optical axis thereof to thereby shift an image and correct the fluctuation of image position attributable to hand vibration.

As disclosed in Japanese Patent Publication No. 41-8558 and Japanese Laid-Open Patent Application No. 63-118708, the amount of shift $\Delta s$ of an image when some lens unit, i.e., the shift lens unit, of a lens system is moved by $\delta$ in a direction perpendicular to the optical axis thereof is calculated by the following expression (a):

$$\Delta s = \beta b(1-\beta a)\delta, \qquad (a)$$

where $\beta a$: the lateral magnification of the shift lens unit;

$\beta b$: the lateral magnification of the whole of a lens unit disposed more adjacent to the image side than the shift lens unit.

In this specification, the movement of an image on a plane on which the image is formed due to the vibration of the optical system caused by hand vibration or the like is referred to as the "variation in image position", and the movement of the image realized by the movement of the shift lens unit in a direction perpendicular to the optical axis thereof is referred to as the "shift of image". Also, it is referred to as the "vibration reduction" to move the shift lens unit in a direction substantially perpendicular to the optical axis thereof to thereby correct the variation in image position due to hand vibration or the like. Further, the vibration reduction optical system is a lens system which can obtain good imaging performance even if an image is shifted.

However, in a zoom lens, the lateral magnification of the shift lens unit changes with a change in the focal length of the zoom lens (i.e., a change in the positions of the lens elements in the zoom lens) and therefore, the coefficient $\beta b(1-\beta a)$ in the above-mentioned expression (a) also changes with a change in focal length. As a result, the required amount of drive (the required amount of movement) of the shift lens unit necessary to shift the image by a predetermined amount changes with a change in focal length.

So, it would also occur to mind to drive some of lens units constituting a fourth unit of the four-unit a focal type in a direction perpendicular to the optical axis thereof to thereby maintain the coefficient $\beta b(1-\beta a)$ constant during a change in focal length.

Now, to correct the variation in image position due to hand vibration or the like, for example, the angle of vibration (the angle of inclination of the optical axis of the optical system) is detected as the vibration information of the optical system, and the shift lens unit is driven in accordance with the detected angle of vibration. In the zoom lens, however, the focal length of the entire lens system changes with a change in focal length and therefore, the amount of fluctuation of an image for a predetermined angle of vibration, and further the required amount of shift of the image also change with a change in focal length.

So, it would also occur to mind to divide the focal length of the entire lens system into a plurality of ranges, memorize a predetermined coefficient in each focal length range and effect the same control based on each coefficient in each focal length range. However, an attempt to increase the zoom ratio of a zoom lens would increase the number of divisions of the focal length and the number of coefficients to be memorized would become very great. Also, in a system wherein entirely the same control is effected over the whole of each focal length range, there has been the inconvenience that fundamentally the control error of the shift lens unit is great.

Certainly, it is also conceivable to effect the control of the shift lens unit easily by designing an optical system such that the required amount of drive of the shift lens unit relative to a predetermined angle of vibration becomes constant without depending on the focal length. In this case, however, excessive restriction will be given in making optical design and inconveniences such as the bulkiness of the lens system and an increased number of lens constituents will result.

SUMMARY OF THE INVENTION

The present invention has been made in view of the above-noted problems and the object thereof is to provide a variable focal length optical system capable of shifting an image which can effect the drive control of a shift lens unit for correcting the variation in image position due to hand vibration or the like with a small memory capacity and at high accuracy.

To solve the above-noted problems, according to the present invention, there is provided a variable focal length optical system capable of shifting an image by some shift lens unit constituting the optical system being moved in a direction substantially perpendicular to the optical axis thereof, characterized in that said shift lens unit is driven on the basis of the focal length information of the optical system to reduce the variation in image position due to the vibration of the optical system.

According to a preferred embodiment of the present invention, when a focusing lens unit movable along the optical axis thereof during focusing on a short distance object (an object positioned at a closest distance) is disposed more adjacent to the object side than said shift lens unit, the required amount of drive of said shift lens unit is calculated on the basis of said focal length information and a memorized predetermined coefficient. Also, when the focusing lens unit movable along the optical axis thereof during focusing on a short distance object is disposed more adjacent to the image side than said shift lens unit, the required amount of drive of said shift lens unit is calculated on the basis of said focal length information, photographing distance information (i.e., information on the distance of an object in focus) and a stored predetermined coefficient.

A method of shifting an image will first be described.

Generally, when some lens unit constituting a lens system is moved as a shift lens unit in a direction perpendicular to the optical axis thereof, an image obtained on an image plane shifts, with the movement of the shift lens unit, in the direction perpendicular to the optical axis.

However, when the shift lens unit is moved, fluctuations of various aberrations occur and the quality of an image is deteriorated as the image shifts. Accordingly, to make the shift of the image possible, it is necessary to suppress the fluctuations of the various aberrations due to the movement of the shift lens unit and decrease the deterioration of the quality of the image.

So, description will hereinafter be made of a method of suppressing the fluctuations of the various aberrations occurring when the shift lens unit is moved in a direction substantially perpendicular to the optical axis.

Generally, in a lens system, when the sine condition becomes positive and large as compared with spherical aberration, an off-axis light flux exhibits positive coma tendency in a paraxial area a little off the optical axis. When, conversely, the sine condition becomes negative and large as compared with spherical aberration, the off-axis light flux exhibits negative coma tendency.

Accordingly, unless spherical aberration and the sine condition are corrected in a well balanced manner by the shift lens unit singly, coma will occur in the central portion of the image field when the shift lens unit is moved from on the optical axis to the off-axis. As a result, the deterioration of the quality of image in the central portion of the image field occurring when the shift lens unit is moved will become remarkable.

Also, when the Petzval sum by the shift lens unit singly is not an appropriate value, as the shift lens unit is moved from on the optical axis to the off-axis, negative curvature of image field occurs on one side and positive curvature of image field occurs on the other side, and the image field is inclined. Therefore, it is necessary to make the Petzval sum by the shift lens unit singly into an appropriate value and suppress the fluctuation of curvature of image field occurring when the shift lens unit is moved.

Further, when the correction of chromatic aberration in the shift lens unit is deficient, the fluctuation of chromatic aberration occurs with the movement of the shift lens unit and therefore, the correction of chromatic aberration by the shift lens unit singly is required.

In the variable focal length optical system of the present invention, the shift lens unit is moved in a direction substantially perpendicular to the optical axis thereof to thereby shift an image. Accordingly, by combining the variable focal length optical system of the present invention capable of shifting an image, for example, with detecting means for detecting the angle of vibration due to hand vibration and drive means for driving the shift lens unit in the direction substantially perpendicular to the optical axis, it is possible to suitably move the shift lens unit by the drive means, and offset the variation in image position due to hand vibration by the shift of the image due to the movement of the shift lens unit to thereby correct the variation in image position due to hand vibration.

So, description will now be made of a specific method of correcting the variation in image position due to hand vibration or the like.

When as shown in the aforementioned expression (a), the lateral magnification of the shift lens unit is defined as $\beta a$ and the lateral magnification of the entire lens units disposed more adjacent to the image side than the shift lens unit is defined as $\beta b$, the amount of shift $\Delta s$ of the image in relation to the amount of movement (the amount of drive) $\delta$ of the shift lens unit is expressed as the following expression (b) in the paraxial area:

$$\Delta s = \delta \cdot \beta b (1-\beta a) \qquad (b)$$

Also, when the focal length of the entire lens system is defined as f, the image height y for an angle of view $\theta$ is represented by the following expression (c):

$$y = f \tan \theta \qquad (c)$$

When the angle of view $\theta$ is small, an approximate relation shown in the following expression (d) is established.

$$y = f\theta \qquad (d)$$

Accordingly, the amount of variation $\delta s$ in image position in relation to the angle of vibration $\epsilon$ which is the vibration information of the lens system is represented by the following expression (e):

$$\delta s = f \cdot \epsilon \qquad (e)$$

Thus, by the shift lens unit being driven so as to satisfy the relation that $\delta s + \Delta s = 0$, in other words, so as to offset the amount of variation $\delta s$ in image position by the amount of shift $\Delta s$ of the image, the variation in image position due to hand vibration or the like can be corrected.

Accordingly, in the present invention, by the shift lens unit being driven so as to satisfy the relation of the following expression (f), the variation in image position due to hand vibration or the like is corrected.

$$\delta = -\{f/\beta b(1-\beta a)\} \cdot \epsilon \qquad (f)$$

Of course, the above expression (f) is derived on the basis of a condition under which expression (b) and expression (e) satisfy the relation that $\delta s + \Delta s = 0$.

In the variable focal length optical system, the value of $f/\beta b(1-\beta a)$ changes with a change in focal length. Now, during a change in focal length, the lateral magnification of each lens unit continuously changes and therefore, the value of $\beta b(1-\beta a)$ continuously changes. Accordingly, the value of $f/\beta b(1-\beta a)$ also changes during a change in focal length. So, $f/\beta b(1-\beta a)$ can be approximated by the following polynomial (g) as a relational expression based on focal length information $\Delta$:

$$-f/\beta b(1-\beta a) = \Sigma a_i \Delta^i (i=0,1,2,3,\ldots) \quad (g)$$

where $a_i$: a coefficient.

As the focal length information $\Delta$, use can be made, for example, of an amount of movement or the like resulting from a change in the focal length of a particular lens unit.

Thus, from the above-mentioned expressions (f) and (g), the required amount of drive $\delta$ of the shift lens unit can be represented by the following expression (h):

$$\delta = \epsilon \cdot \Sigma a_i \Delta^i (i=0,1,2,3\ldots) \quad (h)$$

The optical performance required on the image plane does not depend on the focal length but is constant, but the focal length is longer in the maximum focal length state than in the minimum focal length state and therefore, the image shifts greatly in the maximum focal length state even for a small angle of vibration. Therefore, to obtain good imaging performance even during the shift of the image, it is necessary to effect the drive control of the shift lens unit with higher accuracy in the maximum focal length state.

So, in the present invention, design is made such that the required amount of drive of the shift lens unit for a predetermined angle of vibration becomes greater in the maximum focal length state than at the minimum focal length state.

When in expression (f), X is substituted for "$-f/\beta b(1-\beta a)$" and X in the minimum focal length state is defined as Xw and X in the maximum focal length state is defined as Xt and the zoom ratio of the lens system is defined as Z, it is desirable to satisfy the following conditional expression (i):

$$1 < Xt/Xw < Z \quad (i)$$

When the upper limit value of conditional expression (i) is exceeded, the accuracy of the drive control of the shift lens unit required in the minimum focal length state becomes greater than the accuracy of the drive control of the shift lens unit required in the maximum focal length state. As a result, the shift lens unit must be driven with still higher position accuracy, and this results in a higher cost.

Further, in the present invention, in order to effect the drive control of the shift lens unit with higher accuracy, it is desirable that the lower limit value of conditional expression (i) be $Z^{1/8}$ and the upper limit value thereof be $Z^{1/2}$.

Also, to effect the highly accurate drive control of the shift lens unit over the whole of the focal length range from the minimum focal length state to the maximum focal length state, it is desirable that $\delta |X| \delta f$ monotonously increase with a change in focal length from the minimum focal length state to the maximum focal length state.

When the image is to be shifted by a predetermined amount, it is desirable for the downsizing of a drive mechanism for moving the shift lens unit and the simplification of the construction of a lens barrel to make the amount of work (=weight×amount of drive) of the shift lens unit small and to make the lens diameter of the shift lens unit small.

Description has been made above of the change in the amount of drive of the shift lens unit during a change in focal length. Description will hereinafter be made of the drive control of the shift lens unit during focusing.

In a variable focal length optical system, generally some lens unit (i.e., a focusing lens unit) in lens units constituting the lens system is moved along the optical axis thereof, whereby focusing is effected. When the focusing lens unit is disposed more adjacent to the image side than the shift lens unit, the lateral magnification $\beta a$ of the shift lens unit changes during focusing depending on the object position (photographing distance). As a result, the value of X and further the required amount of drive of the shift lens unit change not only during a change in focal length but also during focusing.

On the other hand, when the focusing lens unit is disposed more adjacent to the object side than the shift lens unit, the lateral magnification $\beta a$ of the shift lens unit does not depend on the object position (photographing distance) but is constant during focusing. As a result, the value of X and further the required amount of drive of the shift lens unit become constant during focusing.

Accordingly, when the focusing lens unit is disposed more adjacent to the image side than the shift lens unit, X can be expressed as the following expression (j) correspondingly to the above-mentioned expression (g).

$$X = \Sigma a_{ij} \Delta^i R^{-j} (i=0,1,2,3,\ldots, j=0,1,2,3,\ldots) \quad (j)$$

where

R: Photographing distance;

$a_{ij}$: a coefficient.

Thus, from the above-mentioned expression (f) and (j), when the focusing lens unit is disposed more adjacent to the object side than the shift lens unit, the required amount $\delta$ of drive of the shift lens unit can be represented by the following expression (k):

$$\delta = \epsilon \cdot \Sigma a_{ij} \Delta^i R^{-j} (i=0,1,2,3,\ldots, j=0,1,2,3,\ldots) \quad (k)$$

As previously described, when the focusing lens unit is disposed more adjacent to the image side than the shift lens unit, the required amount $\delta$ of drive of the shift lens unit can be represented by the aforementioned expression (h) without depending on the photographing distance R.

DESCRIPTION OF THE PREFERRED EMBODIMENTS

Each embodiment of the present invention will hereinafter be described with reference to the accompanying drawings.

In each embodiment of the present invention, an aspherical surface is represented by the following mathematical expression (m) when the height of a point on the surface in a direction perpendicular to an optical axis is defined as y and the amount of displacement at the height y in the direction of the optical axis is defined as S(y) and the fiducial radius of curvature, i.e., the radius of curvature of the aspherical surface at the vertex, is defined as r and the cone coefficient is defined as κ and the nth-order aspherical coefficient is defined as Cn.

$$S(y)=(r/\kappa)/[1-(1-\kappa \cdot y^2/r^2)^{1/2}]+C_4 \cdot y^4+C_6 \cdot y^6+C_8 \cdot y^8+C_{10} \cdot y^{10}+ \ldots \quad (m)$$

The aspherical surface in the table of numerical data of each embodiment is given a mark * at the right of its surface number.

[Embodiment 1]

Figure 1:
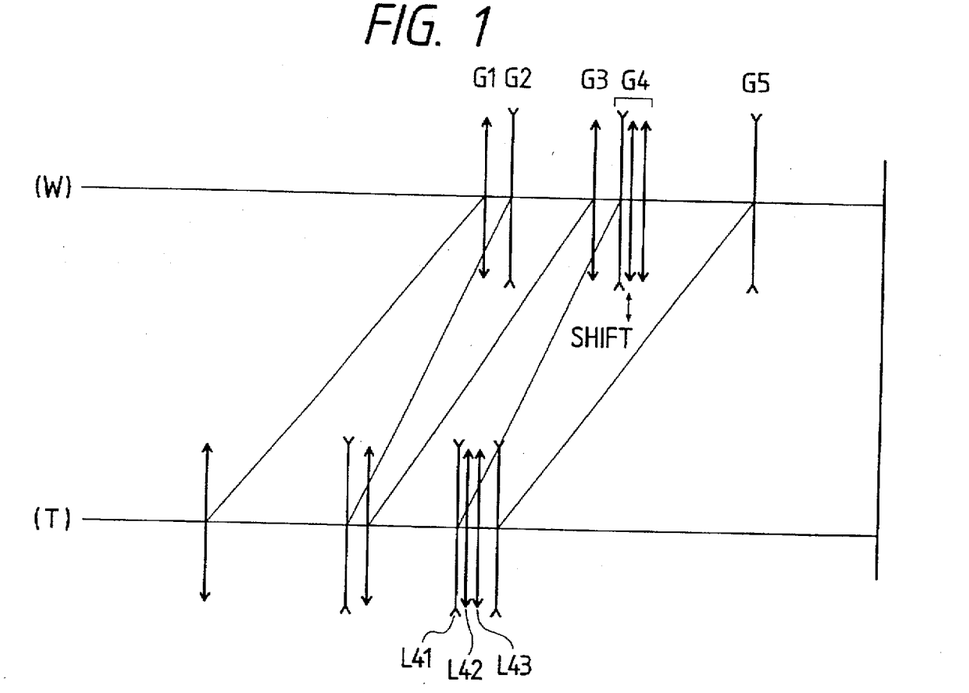
FIG. 1 shows the distribution of the refractive powers of a variable focal length optical system according to a first embodiment of the present invention and the state of movement of each lens unit during a change in focal length from the wide angle end to the telephoto end.

FIG. 1 shows the distribution of the refractive power of a variable focal length optical system according to a first embodiment of the present invention and the state of movement of each lens unit during a change in focal length from the minimum focal length state (W) to the maximum focal length state (T).

As shown in FIG. 1, the variable focal length optical system according to the first embodiment of the present invention is comprised, in succession from the object side, of a first lens unit G1 having positive refractive power, a second lens unit G2 having negative refractive power, a third lens unit G3 having positive refractive power, a fourth lens unit G4 having positive refractive power, and a fifth lens unit G5 having negative refractive power.

The fourth lens unit G4 is comprised, in succession from the object side, of a negative lens component L41, a positive lens component L42 and a positive lens component L43.

During a change in focal length from the minimum focal length state to the maximum focal length state, each lens unit is moved toward the object side so that the air space between the first lens unit G1 and the second lens unit G2 increase, the air space between the second lens unit G2 and the third lens unit G3 may decrease, the air space between the third lens unit G3 and the fourth lens unit G4 may increase and the air space between the fourth lens unit G4 and the fifth lens unit G5 may decrease.

During the change in focal length from the minimum focal length state to the maximum focal length state, the second lens unit G2 and the fourth lens unit G4 are moved together with each other, and the third lens unit G3 is moved relative to the second lens unit G2 and the fourth lens unit G4.

Figure 2:
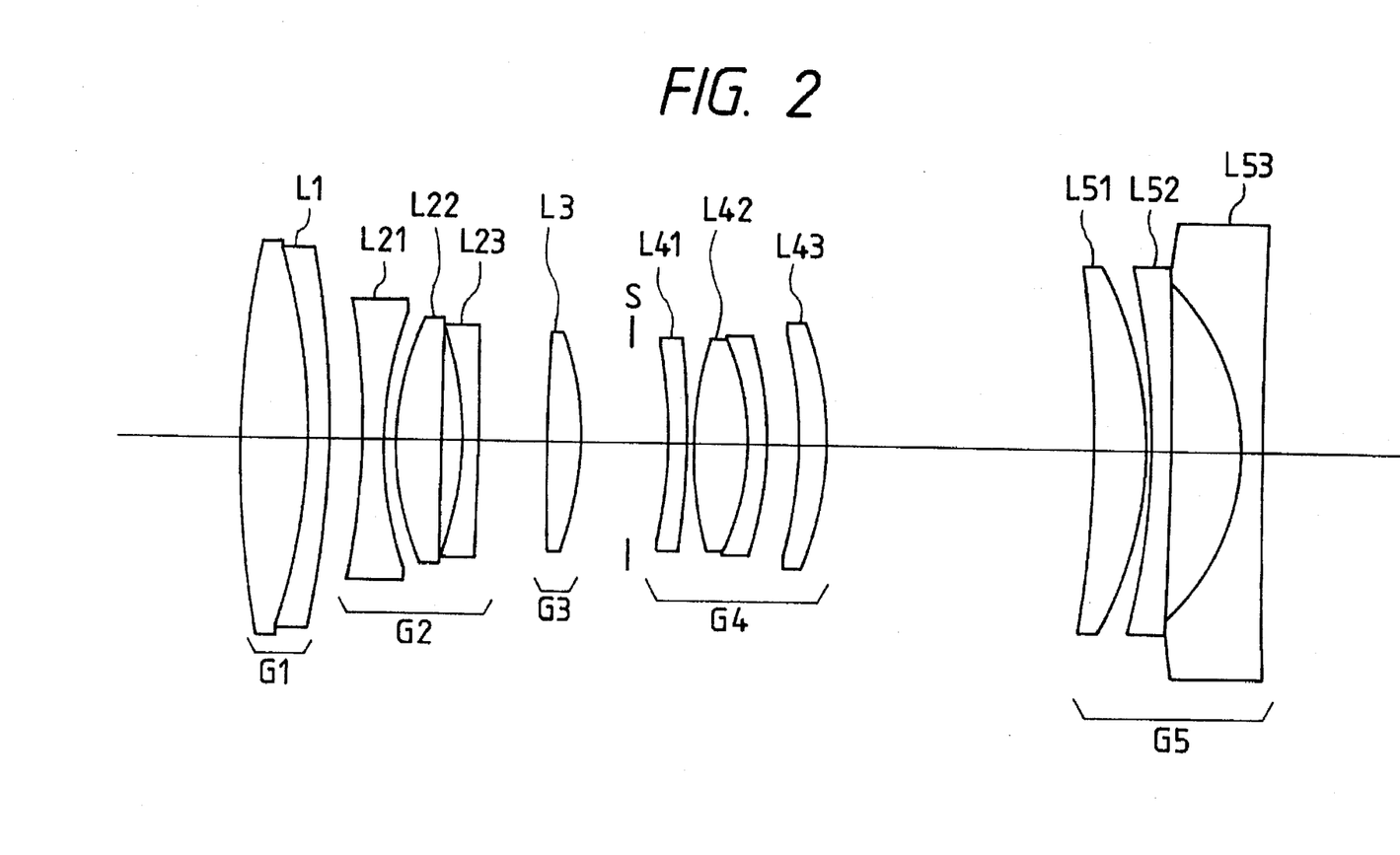
FIG. 2 shows the lens construction of the variable focal length optical system according to the first embodiment of the present invention.

FIG. 2 shows the lens construction of the variable focal length optical system according to the first embodiment of the present invention.

The variable focal length optical system of FIG. 2 is comprised, in succession from the object side, of a first lens unit G1 comprising a positive cemented lens L1 consisting of a biconvex lens and a negative meniscus lens having its concave surface facing the object side, a second lens unit G2 comprising a biconcave lens L21, a biconvex lens L22 and a negative meniscus lens L23 having its concave surface facing the object side, a third lens unit G3 comprising a biconvex lens L3, a fourth lens unit G4 comprising a negative meniscus lens L41 having its concave surface facing the object side, a positive cemented lens L42 consisting of a biconvex lens and a negative meniscus lens having its concave surface facing the object side, and a positive meniscus lens L43 having its concave surface facing the object side, and a fifth lens unit G5 comprising a positive meniscus lens L51 having its concave surface facing the object side, and a negative meniscus lens having its concave surface facing the object side.

An aperture stop S is disposed between the third lens unit G3 and the fourth lens unit G4.

FIG. 2 shows the positional relations among the respective lens units at the minimum focal length state, and during a change in focal length to the maximum focal length state, the lens units are moved on the optical axis thereof along tracks indicated by lines in FIG. 1.

Also, as shown in FIG. 1, the positive cemented lens L42 of the three lens components constituting the fourth lens unit G4 is moved in a direction substantially orthogonal to the optical axis to thereby effect image shift, thus correcting the variation in image position due to hand vibration or the like.

Further, as shown in FIG. 1, the third lens unit G3 is moved toward the image side along the optical axis to thereby effect focusing on a short distance object.

The numerical values of Embodiment 1 of the present invention are given in Table 1 below. In Table 1, f represents the focal length, FNO represents F-number, 2ω represents the angle of view, Bf represents the back focus, and Δ represents the amount of axial movement of the first lens unit G1 with focal length information at the wide angle end as the reference. The surface numbers are counted from the object side. The refractive indices and Abbe numbers indicate values for d-line (λ=587.6 nm).

TABLE 1 f = 38.79–153.22
FNO = 3.91–10.00
2ω = 58.7–16.6

| surface number | radius of curvature | inter-surface spacing | refractive index | abbe number |
|---|---|---|---|---|
| 1 | 73.3723 | 4.62 | 1.48749 | 70.41 |
| 2 | −41.3728 | 1.38 | 1.86074 | 23.01 |
| 3 | −63.5060 | (d3 = variable) | | |
| 4 | −40.8258 | 1.13 | 1.79668 | 45.37 |
| 5 | 21.8873 | 0.88 | | |
| 6 | 18.8014 | 3.14 | 1.78472 | 25.80 |
| 7 | −125.2349 | 1.00 | | |
| 8 | −20.9542 | 1.13 | 1.79668 | 45.37 |
| 9 | −221.6481 | (d9 = variable) | | |
| 10 | 437.8482 | 2.13 | 1.51680 | 64.10 |
| 11 | −20.1039 | (d11 = variable) | | |
| 12 | ∞ | 2.26 | (aperture stop S) | |
| 13* | −44.4771 | 1.26 | 1.58518 | 30.24 |
| 14 | −62.7167 | 0.38 | | |
| 15 | 28.0309 | 3.39 | 1.48749 | 70.41 |
| 16 | −14.9351 | 1.26 | 1.86074 | 23.01 |
| 17 | −24.7823 | 2.01 | | |
| 18 | −24.3656 | 1.63 | 1.49108 | 57.57 |
| 19 | −20.8520 | (d19 = variable) | | |
| 20 | −62.9139 | 3.14 | 1.80458 | 25.50 |
| 21 | −22.4198 | 0.25 | | |
| 22 | −53.4113 | 1.26 | 1.77279 | 45.37 |
| 23 | −214.2797 | 4.27 | | |
| 24 | −15.0687 | 1.50 | 1.77279 | 49.45 |
| 25 | −828.1507 | (βf) | | |

(aspherical surface data)

13th surface  κ = 1.0000   $C_4 = -0.2141 \times 10^{-4}$ $C_6 = -0.4131 \times 10^{-7}$   $C_8 = -0.1680 \times 10^{-8}$   $C_{10} = 0.1023 \times 10^{-10}$ (variable spacing in change in focal length)

| | Δ | focal length | d3 | d9 | d11 | d19 | βPf |
|---|---|---|---|---|---|---|---|
| (A) | 0.000 | 38.794 | 2.135 | 4.406 | 3.129 | 16.801 | 9.059 |
| (B) | 8.789 | 50.738 | 7.237 | 3.686 | 3.849 | 13.134 | 16.462 |
| (C) | 17.579 | 64.003 | 11.049 | 2.965 | 4.570 | 10.496 | 24.124 |
| (D) | 26.363 | 78.314 | 14.272 | 2.245 | 5.290 | 8.586 | 31.635 |
| (E) | 34.889 | 91.993 | 17.179 | 2.047 | 5.488 | 6.731 | 39.110 |
| (F) | 43.412 | 106.381 | 19.984 | 1.849 | 5.686 | 5.172 | 46.377 |
| (G) | 51.944 | 121.461 | 21.698 | 1.651 | 5.883 | 3.905 | 54.446 |
| (H) | 60.467 | 137.092 | 23.463 | 1.454 | 6.081 | 2.813 | 62.267 |
| (I) | 67.989 | 153.220 | 24.996 | 1.256 | 6.279 | 1.877 | 70.131 |

(the amount of drive δ of lens component L42 when the image is shifted by 0.01 [rad])

TABLE 1-continued

| | Δ | focal length | amount of drive [mm] |
|---|---|---|---|
| (A) | 0.000 | 38.794 | 0.31186 |
| (B) | 8.789 | 50.738 | 0.34026 |
| (C) | 17.579 | 64.003 | 0.36582 |
| (D) | 26.363 | 78.314 | 0.39083 |
| (E) | 34.889 | 91.993 | 0.41197 |
| (F) | 43.412 | 106.381 | 0.43456 |
| (G) | 51.944 | 121.461 | 0.45025 |
| (H) | 60.467 | 137.092 | 0.46745 |
| (I) | 67.989 | 153.220 | 0.48365 |

In the variable focal length optical system according to the first embodiment, the third lens unit G3 which is a focusing lens unit is disposed more adjacent to the object side than the positive lens component L42 which is a shift lens unit. Accordingly, the required amount of drive of the shift lens unit does not depend on photographing distance information, but changes on the basis of only focal length information.

Thus, in the first embodiment, the required amount of drive $\delta$ of the lens component L42 necessary to correct the angle of vibration $\epsilon$ [0.01 rad] can be highly accurately approximated by the following expression (n) corresponding to the above-mentioned expression (h).

$$\delta = \epsilon \cdot (0.31186 + 0.413337 \times 10^{-2} \times \Delta - 0.186951 \times 10^{-4} \times \Delta^2) \quad (n)$$

That is, in the first embodiment, simply by memorizing three coefficients in total, the driving of the shift lens unit for the correction of the variation in image position can be controlled highly accurately over each focal length state.

(Embodiment 2)

Figure 3:
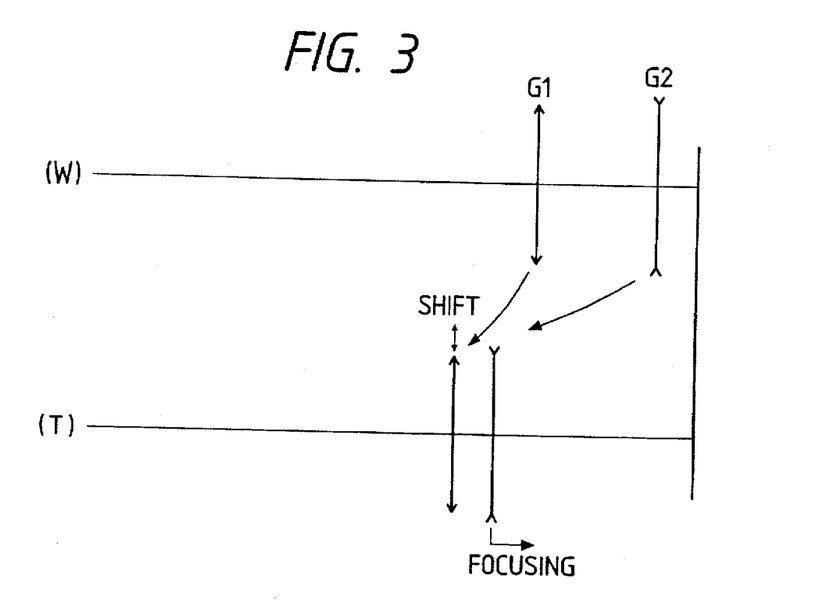
FIG. 3 shows the distribution of the refractive powers of a variable focal length optical system according to a second embodiment of the present invention and the state of movement of each lens unit during a change in focal length from the wide angle end to the telephoto end.

FIG. 3 shows the distribution of the refractive power of a variable focal length optical system according to a second embodiment of the present invention and the state of movement of each lens unit during a change in focal length from the maximum wide-angle state (W) to the maximum focal length state (T).

As shown in FIG. 3, the variable focal length optical system according to the second embodiment of the present invention is comprised, in succession from the object side, of a first lens unit G1 having positive refractive power, and a second lens unit G2 having negative refractive power.

During the change in focal length from the minimum focal length state to the maximum focal length state, each lens unit is moved toward the object side so that the air space between the first lens unit G1 and the second lens unit G2 may decrease.

Figure 4:
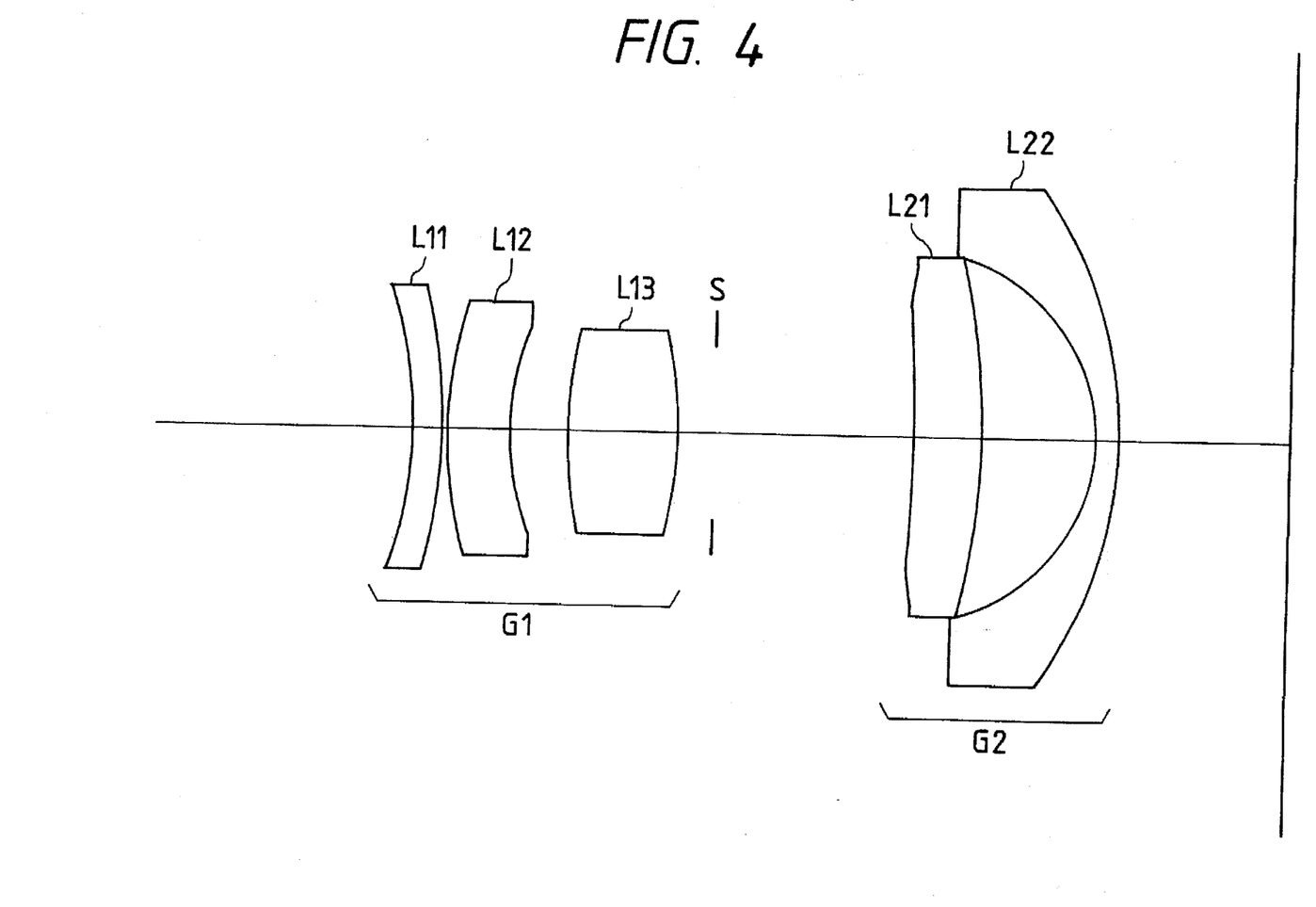
FIG. 4 shows the lens construction of the variable focal length optical system according to the second embodiment of the present invention.

FIG. 4 shows the lens construction of the variable focal length optical system according to the second embodiment of the present invention.

The variable focal length optical system of FIG. 4 is comprised, in succession from the object side, of a first lens unit G1 comprising a negative meniscus lens L11 having its concave surface facing the object side, a negative meniscus lens L12 having its convex surface facing the object side, and a biconvex lens L13, and a second lens unit G2 comprising a positive meniscus lens L21 having its concave surface facing the object side, and a negative meniscus lens L22 having its concave surface facing the object side.

An aperture stop S is disposed between the first lens unit G1 and the second lens unit G2.

FIG. 4 shows the positional relations among the lens units at the minimum focal length state, and during a change in focal length to the maximum focal length state, the lens units are moved on the optical axis thereof along zoom tracks indicated by arrows in FIG. 3.

Also, as shown in FIG. 3, the first lens unit G1 is moved in a direction substantially orthogonal to the optical axis to thereby effect image shift and correct the variation in image position due to hand vibration or the like.

Further, as shown in FIG. 3, the second lens unit G2 is moved toward the image side along the optical axis to thereby effect focusing on a short distance object.

The numerical values of Embodiment 2 of the present invention are given in Table 2 below. In Table 2, f represents the focal length, FNO represents F-number, 2ω represents the angle of view, βf represents the back focus, and Δ represents the amount of axial movement of the first lens unit G1 with focal length information at the wide angle end as the reference. Further, the surface numbers are counted from the object side. The refractive indices and Abbe numbers indicate values for d-line (λ=587.6 nm).

TABLE 2 f = 38.62–73.12
FNO = 4.23–8.00
2ω = 58.5–33.2

| surface number | radius of curvature | inter-surface spacing | refractive index | abbe number |
|---|---|---|---|---|
| 1 | −20.2289 | 1.52 | 1.80518 | 25.36 |
| 2 | −29.9094 | 0.25 | | |
| 3* | 19.3791 | 3.75 | 1.58518 | 30.24 |
| 4 | 16.5346 | 3.05 | | |
| 5 | 32.1085 | 6.25 | 1.61800 | 63.39 |
| 6 | −19.4898 | 1.88 | | |
| 7 | ∞ | (d7 = variable) | (aperture stop S) | |
| 8* | −47.4929 | 3.75 | 1.58518 | 30.24 |
| 9 | −40.1809 | 5.97 | | |
| 10 | −10.2594 | 1.50 | 1.74400 | 44.87 |
| 11 | −23.1832 | (βf) | | |

(aspherical surface data)

| | κ | $C_4$ | |
|---|---|---|---|
| 3rd surface | 1.0000 | −0.4958 × 10$^{-4}$ | |
| | $C_6$ | $C_8$ | $C_{10}$ |
| | 0.2762 × 10$^{-6}$ | −0.9759 × 10$^{-8}$ | 0.5499 × 10$^{-10}$ |
| | κ | $C_4$ | |
| 8th surface | 1.0000 | 0.6367 × 10$^{-4}$ | |
| | $C_6$ | $C_8$ | $C_{10}$ |
| | 0.8470 × 10$^{-7}$ | 0.2768 × 10$^{-8}$ | 0.1735 × 10$^{-10}$ |

(variable spacing in change in focal length)

| | Δ | focal length | d7 | βf |
|---|---|---|---|---|
| (A) | 0.000 | 38.6244 | 11.0342 | 9.3896 |
| (B) | 11.800 | 56.2488 | 4.9424 | 27.1614 |
| (C) | 25.6146 | 73.1231 | 1.8616 | 44.1768 |

(the amount of drive δ of the first lens unit G1 when the image is shifted by 0.01 [rad])

| | Δ | focal length | amount of drive [mm] |
|---|---|---|---|
| (A) | 0.0000 | 38.6244 | 0.27290 |
| (B) | 11.6800 | 56.2488 | 0.27290 |
| (C) | 25.6146 | 73.1231 | 0.27290 |

In the variable focal length optical system according to the second embodiment, the second lens unit G2 which is a focusing lens unit is disposed more adjacent to the image side than the first lens unit G1 which is a shift lens unit. Accordingly, the lateral magnification βa of the shift lens unit depends on the object position (photographing distance) and changes during focusing. As a result, the required amount of drive δ of the shift lens unit changes depending on not only focal length information but also photographing distance information.

Thus, in the second embodiment, the required amount of drive δ[mm] of the first lens unit G1 necessary to correct the angle of vibration ε[0.01 rad] can be approximated highly accurately by the following expression (O) corresponding to the above-mentioned expression (k).

$$\delta = \epsilon \cdot \{0.27290 + (0.276367 \times 10^{-2} - \qquad (O)$$
$$0.64208 \times 10^{-3} \times \Delta + 0.14365 \times 10^{-4} \times \Delta^2)/R +$$
$$(0.133510 \times 10^{-2} - 0.15966 \times 10^{-3} \times$$
$$\Delta + 0.38483 \times 10^{-5} \times \Delta^2)/R^2\}$$

That is, in the second embodiment, simply by memorizing seven coefficients in total, the driving of the shift lens unit for the correction of the variation in image position can be controlled highly accurately over each focal length state and each photographing distance state.

Figure 5:
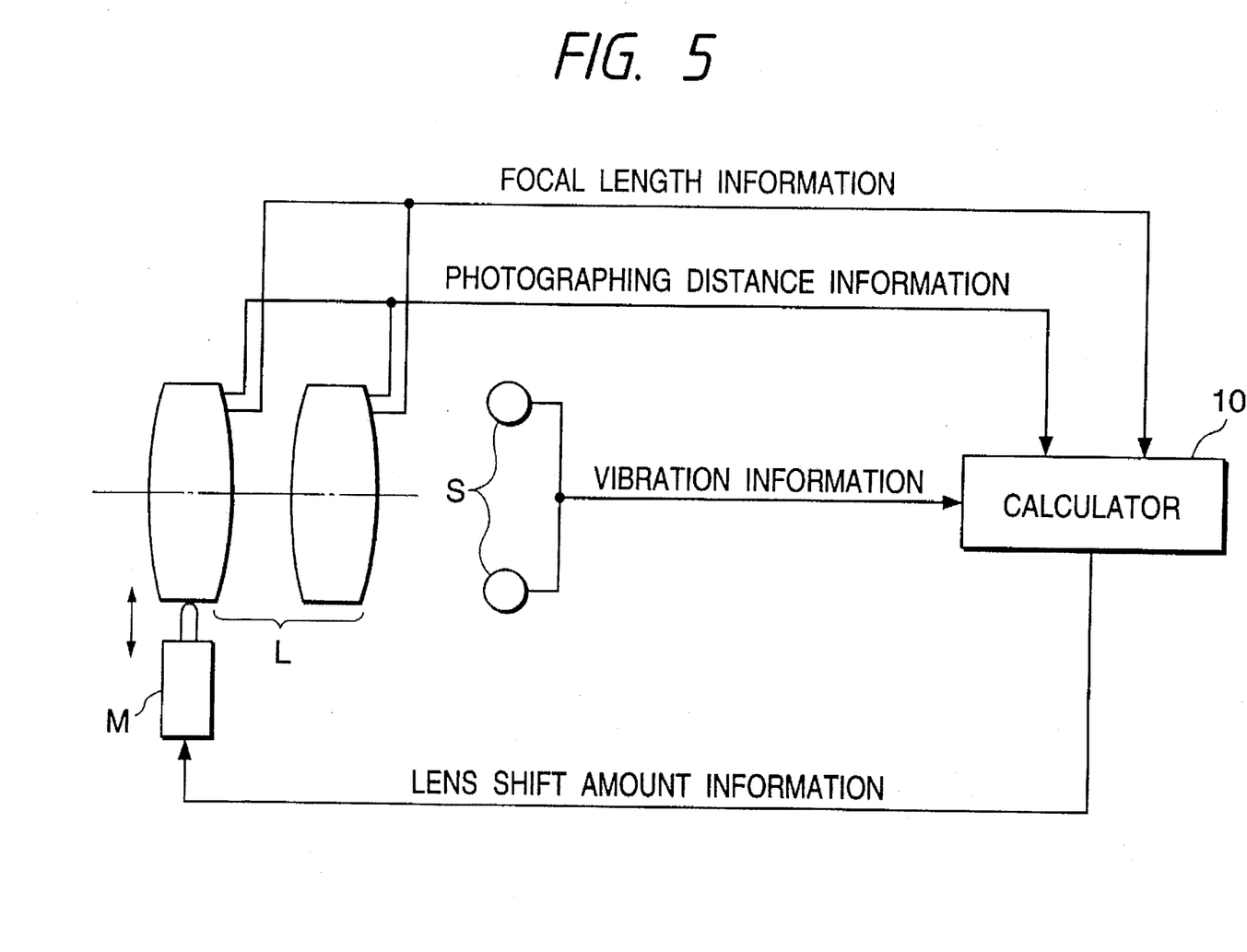
FIG. 5 is a diagram explaining a system for driving the shift lens.

The actual shift of the shift lens unit is performed in the following manner as shown in FIG. 5. When the focal length of a variable focal length optical system L is varied, the focal length information is transmitted to a calculator 10. A vibration sensor S detects a vibration angle and sends information to the calculator 10. The calculator 10 performs calculation based on the thus obtained focal length information, vibration information and stored coefficients so as to determine the shift amount of the shift lens unit. Then, shift amount information for the shift lens unit is transmitted from the calculator 10 to a drive means M, so that the shift lens unit is shifted in the direction perpendicular to the optical axis by a certain amount. It is preferable that the drive means M be a motor such as a DC motor, stepping motor or ultrasonic motor. Upon focal length variation of the variable focal length optical system L, photographing distance information may also be transmitted to the calculator in parallel with the focal length information, so that the calculator can appropriately calculate the shift amount for the shift lens unit.

As described above, according to the variable focal length optical system of the present invention capable of shifting an image, the drive control of the shift lens unit for correcting the variation in image position due to hand vibration or the like can be effected highly accurately by a small memory capacity.

Also, the variable focal length optical system of the present invention capable of shifting an image can be combined with a vibration detecting system and a drive system to thereby realize a vibration reduction optical system capable of well correcting the variation in image position due to hand vibration or the like.

What is claimed is:

1. A variable focal length optical system comprising a plurality of lens units and capable of shifting an image by shifting a shift lens unit, which constitutes a portion of the optical system, in a direction substantially perpendicular to an optical axis, wherein said shift lens unit is moved based on focal length information of the optical system to correct any variation in image position due to vibration of the optical system, and said optical system satisfies the following condition:

$$1 < Xt/Xw < Z$$

where:

$$Xt = -f_t/\beta b_t(1 - \beta a_t);$$

$$Xw = -f_w/\beta b_w(1 - \beta a_w);$$

and where:

Z: a zoom ratio of the optical system;

$f_t$: the focal length of the entire optical system at a maximum focal length state;

$f_w$: the focal length of the entire optical system at a minimum focal length state;

$\beta a_t$: the lateral magnification of the shift lends unit at the maximum focal length state;

$\beta b_t$: the lateral magnification of an entire lens unit disposed on the image side of the shift lens unit at the maximum focal length state;

$\beta a_w$: the lateral magnification of the shift lens unit at the minimum focal length state;

$\beta b_w$: the lateral magnification of the entire lens unit disposed on the image side of the shift lens unit at the minimum focal length state.

2. A variable focal length optical system capable of shifting an image according to claim 1, wherein a focusing lens unit movable along the optical axis during focusing on an object positioned at a closest distance is disposed on an object side of said shift lens unit, and a required amount of movement of said shift lens unit is calculated based on said focal length information and a predetermined coefficient.

3. A variable focal length optical system capable of shifting an image according to claim 2, wherein, when said focal length information is defined as $\Delta$, vibration information of said optical system is defined as $\epsilon$, and said predetermined coefficient is defined as $a_i$, the required amount of movement $\delta$ of said shift lens unit is calculated based on the following relational expression:

$$\delta = \epsilon \cdot \Sigma a_i \Delta^i \ (i=0, 1, 2, 3, \ldots).$$

4. A variable focal length optical system capable of shifting an image according to claim 1, wherein a focusing lens unit movable along the optical axis during focusing on an object positioned at a closest distance is disposed on an image side of said shift lens unit, and a required amount of movement of said shift lens unit is calculated based on said focal length information, photographing distance information, and a predetermined coefficient.

5. A variable focal length optical system capable of shifting an image according to claim 4, wherein, when said focal length information is defined as $\Delta$, said photographing distance information is defined as R, vibration information of said optical system is defined $\epsilon$, and said predetermined coefficient is defined as $a_{ij}$, the required amount of movement $\delta$ of said shift lends unit is calculated based on the following relational expression:

$$\delta = \epsilon \cdot \Sigma a_{ij} \Delta^i R^{-j} \ (i=0, 1, 2, 3, \ldots j=0, 1, 2, 3, \ldots).$$

6. A variable focal length optical system comprising:

a plurality of lens units including a shift lends unit which is shifted in a direction substantially perpendicular to an optical axis of the optical system so as to shift an image position on a plane on which the image is formed;

said shift lens unit being driven based on focal length information of the optical system to correct any variation in image position due to vibration of the optical system, wherein said optical system satisfies the following condition:

$$1 < Xt/Xw < Z$$

where:

$$Xt = -f_t/\beta b_t(1 - \beta a_t);$$

$$Xw = -f_w/\beta b_w(1 - \beta a_w);$$

and where:

Z: a zoom ratio of the optical system;

$f_t$: the focal length of the entire optical system at a maximum focal length state;

$f_w$: the focal length of the entire optical system at a minimum focal length state;

$\beta a_t$: the lateral magnification of the shift lends unit at the maximum focal length state;

$\beta b_t$: the lateral magnification of an entire lens unit disposed on the image side of the shift lens unit at the maximum focal length state;

$\beta a_w$: the lateral magnification of the shift lens unit at the minimum focal length state;

$\beta b_w$: the lateral magnification of the entire lens unit disposed on the image side of the shift lens unit at the minimum focal length state.

7. A variable focal length optical system according to claim 6, wherein a focusing lens unit movable along the optical axis during focusing on an object positioned at a closest distance is disposed on an object side of said shift lends unit, and a required amount of movement of said shift lens unit is calculated based on said focal length information and a predetermined coefficient.

8. A variable focal length optical system according to claim 7, wherein, when said focal length information is defined as $\Delta$, vibration information of said optical system is defined as $\epsilon$, and said predetermined coefficient is defined as $a_i$, the required amount of movement $\delta$ of said shift lens unit is calculated based on the following relational expression:

$$\delta = \epsilon \cdot \Sigma a_i \Delta^i \ (i=0, 1, 2, 3, \ldots ).$$

9. A variable focal length optical system according to claim 6, wherein a focusing lens unit movable along the optical axis during focusing on an object positioned at a closest distance is disposed on an image side of said shift lens unit, and a required amount of movement of said shift lens unit is calculated based on said focal length information, photographing distance information, and a predetermined coefficient.

10. A variable focal length optical system according to claim 9, wherein, when said focal length information is defined as $\Delta$, said photographing distance information is defined as R, vibration information of said optical system is defined as $\epsilon$, and said predetermined coefficient is defined as $a_{ij}$, the required amount of movement $\delta$ of said shift lens unit is calculated based on the following relational expression:

$$\delta = \epsilon \cdot \Sigma a_{ij} \Delta^i R^{-j} \ (i=0, 1, 2, 3, \ldots ).$$

\* \* \* \* \*